UNITED STATES PATENT OFFICE.

ROBERT E. SCHMIDT, OF ELBERFELD, GERMANY, ASSIGNOR TO THE FARBENFABRIKEN OF ELBERFELD COMPANY, OF NEW YORK.

ANTHRAQUINONE DYE.

SPECIFICATION forming part of Letters Patent No. 605,568, dated June 14, 1898.

Application filed December 29, 1897. Serial No. 664,417. (No specimens.) Patented in Germany December 28, 1893, No. 83,055; in England January 16, 1894, No. 974; in France January 30, 1894, No. 235,896, and May 17, 1897, No. 266,999, and in Italy March 31, 1894, XXVIII, 35,688, LXX, 86, and June 30, 1897, XXXIII, 44,832, LXXXVII, 382.

*To all whom it may concern:*

Be it known that I, ROBERT E. SCHMIDT, doctor of philosophy, chemist, of Elberfeld, Germany, (assignor to the FARBENFABRIKEN OF ELBERFELD COMPANY, of New York,) have invented a new and useful Improvement in the Manufacture of Anthraquinone Dyes, (for which the Farbenfabriken, vormals Friedrich Bayer & Co., has already obtained Letters Patent in Germany, No. 83,055, dated December 28, 1893; in England, No. 974, dated January 16, 1894; in France, No. 235,896, dated January 30, 1894, and No. 266,999, dated May 17, 1897, and in Italy, Reg. Gen. Vol. XXVIII, No. 35,688, Reg. Att. Vol. LXX, No. 86, dated March 31, 1894, and Reg. Gen. Vol. XXXIII, No. 44,832, Reg. Attest Vol. LXXXVII, No. 382, dated June 30, 1897;) and I hereby declare the following to be a clear and exact description of my invention.

My invention relates to the production of a new dyestuff, being a monosulfo-acid of paradiamidoanthrarufin, having the formula:

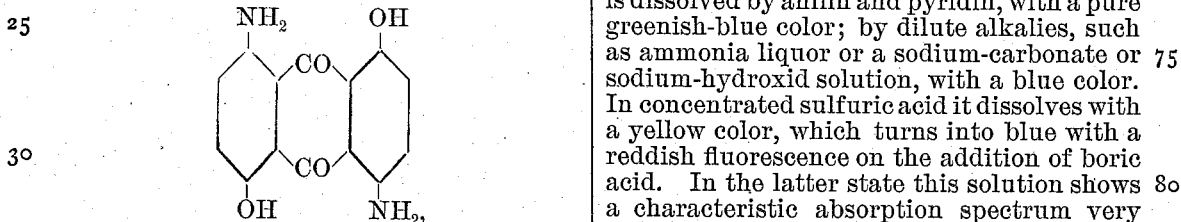

which process consists in treating the paradiamidoanthrarufin (see *Berichte der Deutschen Chemischen Gesellschaft*, Vol. 29, p. 2937, 2940) with a suitable sulfonating agent, such as fuming sulfuric acid or the like. In performing this process care must be taken that detrimental by-reactions are avoided, which can profitably be effected by adding a suitable agent, such as boric acid.

In carrying out my invention practically I can proceed as follows, (the parts being by weight:) Ten parts of paradiamidoanthrarufin are heated, together with two hundred parts of fuming sulfuric acid (containing about thirty per cent. of $SO_3$) and ten parts of crystalline boric acid at from 120° to 130° centigrade until the precipitate obtained by pouring a test portion of the mixture into water readily dissolves in a diluted soda-lye with a pure blue color. The liquid is then allowed to cool, and when cool it is poured into a large quantity of water. The resulting mixture is heated to boiling and filtered. The dark-violet residue remaining on the filter, which represents my new dyestuff, is washed by means of water until the filtrate shows a neutral reaction. If necessary, this dyestuff can be purified by dissolving in a dilute ammonia or sodium-carbonate solution, filtering the solution thus obtained, and finally precipitating the dyestuff with the aid of acids.

The coloring-matter can be used for dyeing purposes either in a pasty state or after previous drying. When dry and pulverized, it represents a blackish powder, which when rubbed assumes a metallic luster. It is insoluble in alcohol, ether, benzene, nitrobenzene, glacial acetic acid, and in acidulated water, slightly soluble in hot pure water. It is dissolved by anilin and pyridin, with a pure greenish-blue color; by dilute alkalies, such as ammonia liquor or a sodium-carbonate or sodium-hydroxid solution, with a blue color. In concentrated sulfuric acid it dissolves with a yellow color, which turns into blue with a reddish fluorescence on the addition of boric acid. In the latter state this solution shows a characteristic absorption spectrum very similar to that of the boric ether of the paradiamidoanthrarufin.

The new coloring-matter dyes unmordanted wool in acid-baths beautiful blue shades, which are distinguished by their fastness against the action of light. On chrome-mordanted wool it produces greenish-blue shades which are very fast to light and milling.

Having now described my invention and in what manner the same is to be performed, what I claim as new, and desire to secure by Letters Patent, is—

1. The production of paradiamidoanthrarufin-monosulfo-acid by sulfonating paradiamidoanthrarufin.

2. The process for producing a monosulfoacid of paradiamidoanthrarufin which process consists in sulfonating the said body by means of fuming sulfuric acid with the addition of boric acid, substantially as hereinbefore described.

3. As a new article of manufacture the new dyestuff, being a monosulfo-acid of paradiamidoanthrarufin of the formula

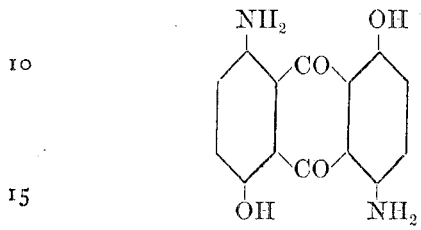

and representing a blackish powder which when rubbed assumes a metallic luster, insoluble in alcohol, ether, benzene, nitrobenzene and in glacial acetic acid, soluble in anilin and pyridin with a pure greenish-blue color, in dilute alkalies with a blue color, yielding with concentrated sulfuric acid (66° Baumé) a yellow solution, which assumes a blue color on the addition of boric acid and shows in this state a characteristic absorption spectrum, dyeing unmordanted wool in acid-baths beautiful blue shades very fast to light, yielding on chrome mordanted wool greenish-blue shades very fast to light and milling.

In testimony whereof I have signed my name in the presence of two subscribing witnesses.

ROBERT E. SCHMIDT.

Witnesses:
R. E. JAHN,
OTTO KÖNIG.